United States Patent
King (10) Patent No.: US 7,568,537 B2
(45) Date of Patent: Aug. 4, 2009

(54) VEHICLE PROPULSION SYSTEM

(75) Inventor: Robert Dean King, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 267 days.

(21) Appl. No.: 11/328,000

(22) Filed: Jan. 9, 2006

(65) Prior Publication Data

US 2007/0158118 A1    Jul. 12, 2007

(51) Int. Cl.
B60L 11/18    (2006.01)
(52) U.S. Cl. .................. 180/65.1; 318/139; 903/907
(58) Field of Classification Search .............. 180/65.1; 318/139, 442; 903/942, 943, 907
See application file for complete search history.

(56) References Cited

U.S. PATENT DOCUMENTS

| | | | |
|---|---|---|---|
| 3,716,409 A * | 2/1973 | Cairns et al. ............... 429/103 |
| 4,533,011 A | 8/1985 | Heidemeyer et al. |
| 4,862,009 A | 8/1989 | King |
| 4,926,104 A | 5/1990 | King et al. |
| 5,168,975 A | 12/1992 | Bernhardt et al. |
| 5,345,154 A | 9/1994 | King |
| 5,373,195 A | 12/1994 | De Doncker et al. |
| 5,589,743 A | 12/1996 | King |
| 5,710,699 A | 1/1998 | King et al. |
| 5,713,425 A | 2/1998 | Buschhaus et al. |
| 5,722,502 A | 3/1998 | Kubo |
| 5,723,956 A | 3/1998 | King et al. |
| 5,883,484 A * | 3/1999 | Akao ....................... 318/700 |
| 5,903,449 A | 5/1999 | Garrigan et al. |
| 5,949,658 A | 9/1999 | Thottuvelil et al. |
| 5,994,789 A * | 11/1999 | Ochiai ....................... 307/10.1 |
| 6,170,587 B1 | 1/2001 | Bullock |
| 6,186,255 B1 | 2/2001 | Shimasaki et al. |
| 6,227,997 B1 | 5/2001 | Fujisawa et al. |
| 6,258,006 B1 | 7/2001 | Hanyu et al. |
| 6,319,168 B1 | 11/2001 | Morris et al. |
| 6,331,365 B1 | 12/2001 | King |
| 6,332,257 B1 | 12/2001 | Reed, Jr. et al. |
| 6,360,834 B1 | 3/2002 | Gauthier |
| 6,401,850 B1 | 6/2002 | Bowen |
| 6,441,581 B1 | 8/2002 | King et al. |
| 6,478,705 B1 | 11/2002 | Holmes et al. |
| 6,481,517 B1 | 11/2002 | Kobayashi et al. |
| 6,486,568 B1 | 11/2002 | King et al. |

(Continued)

FOREIGN PATENT DOCUMENTS

EP        1500549 A2    1/2005

OTHER PUBLICATIONS

PCT Search Report—Sep. 1, 2006.

*Primary Examiner*—Frank B Vanaman
(74) *Attorney, Agent, or Firm*—Ann M. Agosti (57) ABSTRACT

A vehicle propulsion includes an alternating current (AC) traction drive, a first energy storage system electrically coupled to the traction drive through a direct current (DC) link, a second energy storage system electrically coupled to the traction drive such that the voltage output from the second energy storage system is decoupled from the DC link using a bi-directional boost converter, and a uni-directional current device that is poled to conduct current from the low voltage side of the boost converter to the high voltage side of the boost converter.

16 Claims, 6 Drawing Sheets

U.S. PATENT DOCUMENTS

| | | |
|---|---|---|
| 6,507,128 B2 | 1/2003 | King et al. |
| 6,533,692 B1 | 3/2003 | Bowen |
| 6,533,693 B2 | 3/2003 | Bowen et al. |
| 6,569,055 B2 | 5/2003 | Urasawa et al. |
| 6,592,484 B1 | 7/2003 | Tsai et al. |
| 6,603,215 B2 | 8/2003 | Kuang et al. |
| 6,604,591 B2 | 8/2003 | Bowen et al. |
| 6,645,105 B2 | 11/2003 | Kima |
| 6,679,799 B2 | 1/2004 | Bowen |
| 6,729,423 B2 | 5/2004 | Kobayashi et al. |
| 6,737,822 B2 | 5/2004 | King |
| 6,784,563 B2 | 8/2004 | Nada |
| 6,817,432 B2 | 11/2004 | Kitada et al. |
| 6,837,816 B2 | 1/2005 | Tsai et al. |
| 6,909,285 B2 * | 6/2005 | Jordan et al. ................ 324/382 |
| 6,915,220 B2 | 7/2005 | Cardinal et al. |
| 2001/0051291 A1 | 12/2001 | Aoyagi et al. |

\* cited by examiner

VEHICLE PROPULSION SYSTEM

BACKGROUND OF THE INVENTION

This invention relates generally to vehicle drive systems and, more particularly, to battery powered drive systems such as are used in battery powered electric vehicles or hybrid vehicles.

Figure 1:
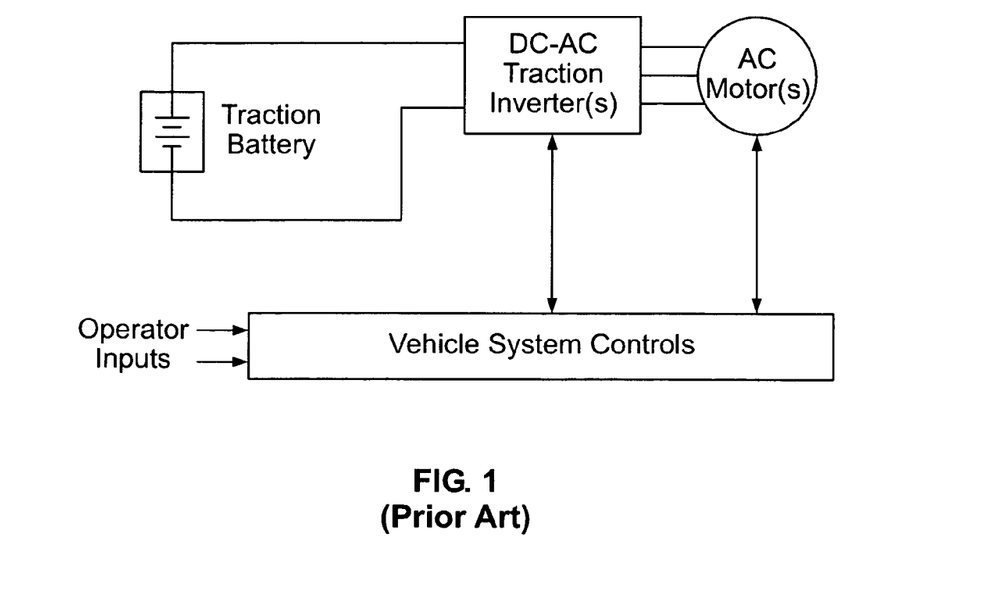
FIG. 1 illustrates a known alternating current (AC) electric drive system.

FIG. 1 illustrates a known alternating current (AC) electric drive system that is used in battery electric vehicles and also hybrid vehicles. As shown, the energy storage unit, which may be a battery, is electrically connected to the direct current (DC) link of an DC-AC traction inverter.

Figure 2:
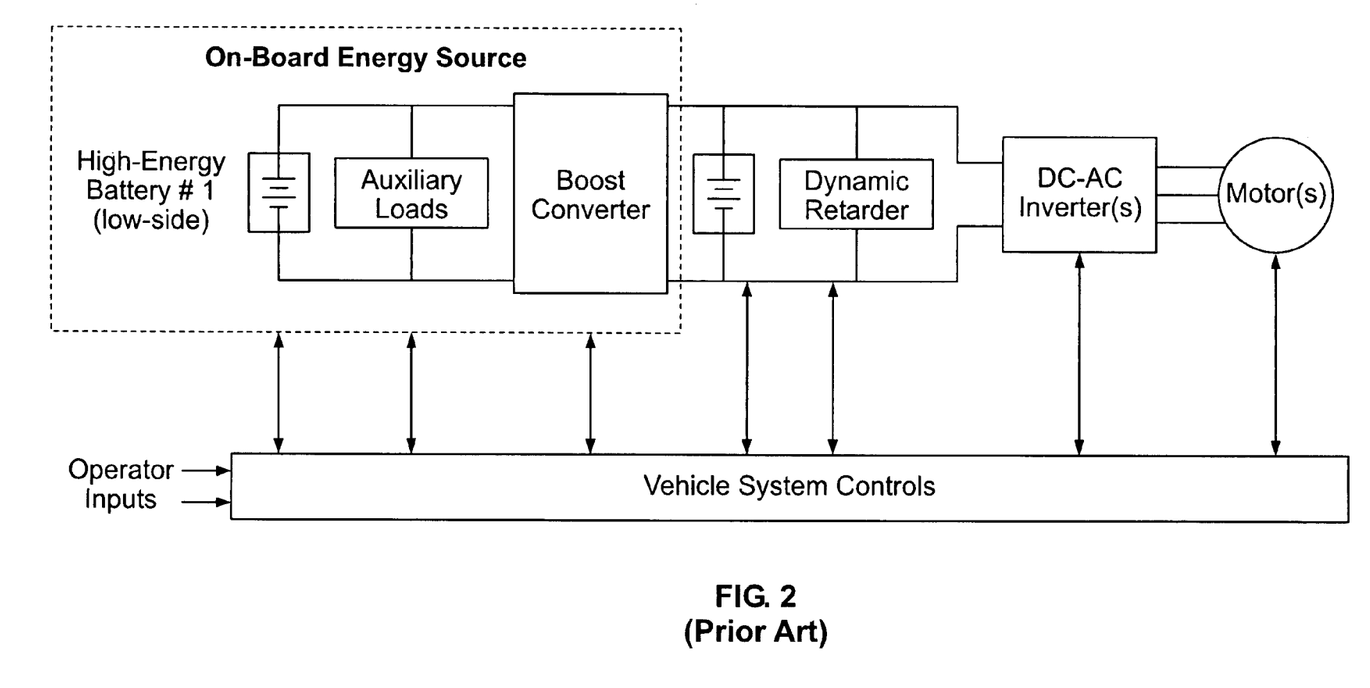
FIG. 2 illustrates a known hybrid drive system.

FIG. 2 illustrates a known hybrid drive system that includes a first battery that is coupled to the low voltage side of the boost converter and a second battery that is coupled to the high voltage side of the boost converter. During operation, this configuration may allow a high specific-energy battery to be used as the energy storage unit, where the voltage rating of the low-side energy storage unit is generally lower than the DC link of the DC-AC traction inverter.

Figure 3:
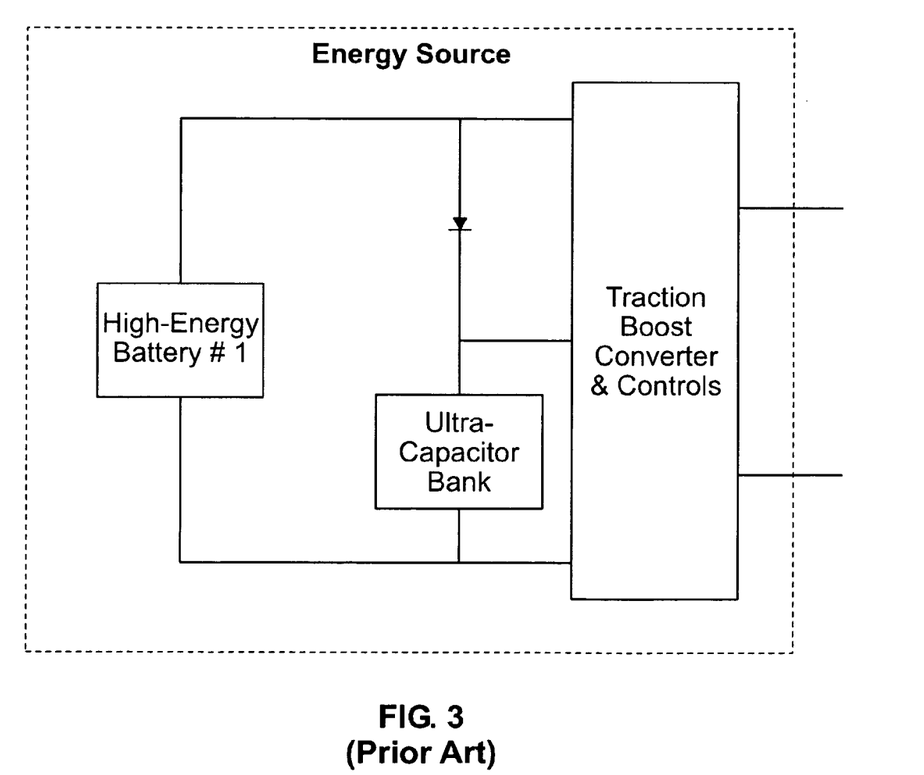
FIG. 3 illustrates a known hybrid drive system.

FIG. 3 illustrates a known hybrid drive system that includes a high specific-energy battery, an ultracapacitor, and a diode that is poled to allow current flow when the ultracapacitor voltage is lower than the voltage of the battery when arranged in the configuration shown in FIG. 3. The configuration in FIG. 3 allows increased levels of power to be transmitted from the battery to the DC link through a two-channel boost converter, where each channel or phase has the same maximum power rating.

While the above described systems are effective during various driving conditions, they may be less effective when the vehicle is operated at relative low speeds as seen during typical urban driving. As a result, the performance or fuel efficiency of the vehicle may be reduced.

BRIEF DESCRIPTION OF THE INVENTION

In one aspect, a vehicle propulsion system is provided. The propulsion system includes an alternating current (AC) traction drive, a first energy storage system electrically connected to the traction drive through a direct current (DC) link, a second energy storage system electrically connected to the traction drive such that the voltage output from the second energy storage system is decoupled from the DC link using a bi-directional boost converter, and a uni-directional current device that is poled to conduct current from the low voltage side of the boost converter to the high voltage side of the boost converter.

In another aspect, a vehicle is provided. The vehicle includes a propulsion system that includes an alternating current (AC) traction drive, a first energy storage system electrically connected to the traction drive through a direct current (DC) link, a second energy storage system electrically connected to the traction drive such that the voltage output from the second energy storage system is decoupled from the DC link using a bi-directional boost converter, and a uni-directional current device that is poled to conduct current from the low voltage side of the boost converter to the high voltage side of the boost converter.

DETAILED DESCRIPTION OF THE INVENTION

Figure 7:
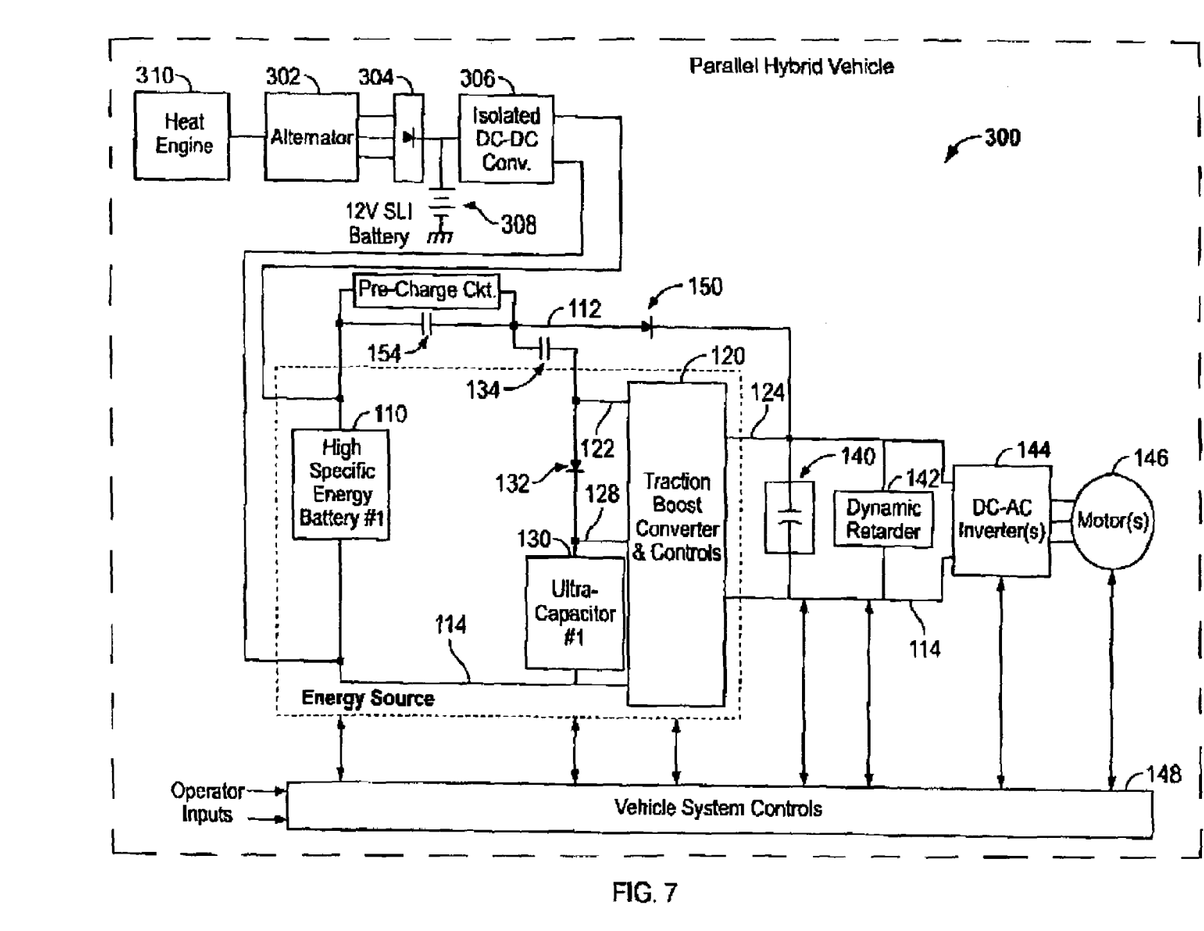
FIG. 7 illustrates an exemplary vehicle propulsion system.

Described herein are control and power storage systems that may be utilized with an electric or hybrid vehicle. Hybrid vehicle and parallel hybrid vehicle as used herein each represents a vehicle that utilizes a combination of an electric motor and a heat engine to provide propulsive force to the vehicle, such as depicted in FIG. 7. Moreover, as used herein, an electric vehicle represents a vehicle that includes a motor and a plurality of batteries, wherein the batteries provide the propulsive force to operate the vehicle.

The systems include an alternating current (AC) traction drive, a first energy storage system electrically connected to the traction drive through a direct current (DC) link, a second energy storage system electrically connected to the traction drive such that the voltage output from the energy storage system is decoupled from the DC link using a bi-directional boost converter, and a uni-directional current device that is poled to conduct current from low voltage side of the boost converter to the high voltage side of the boost converter.

Figure 4:
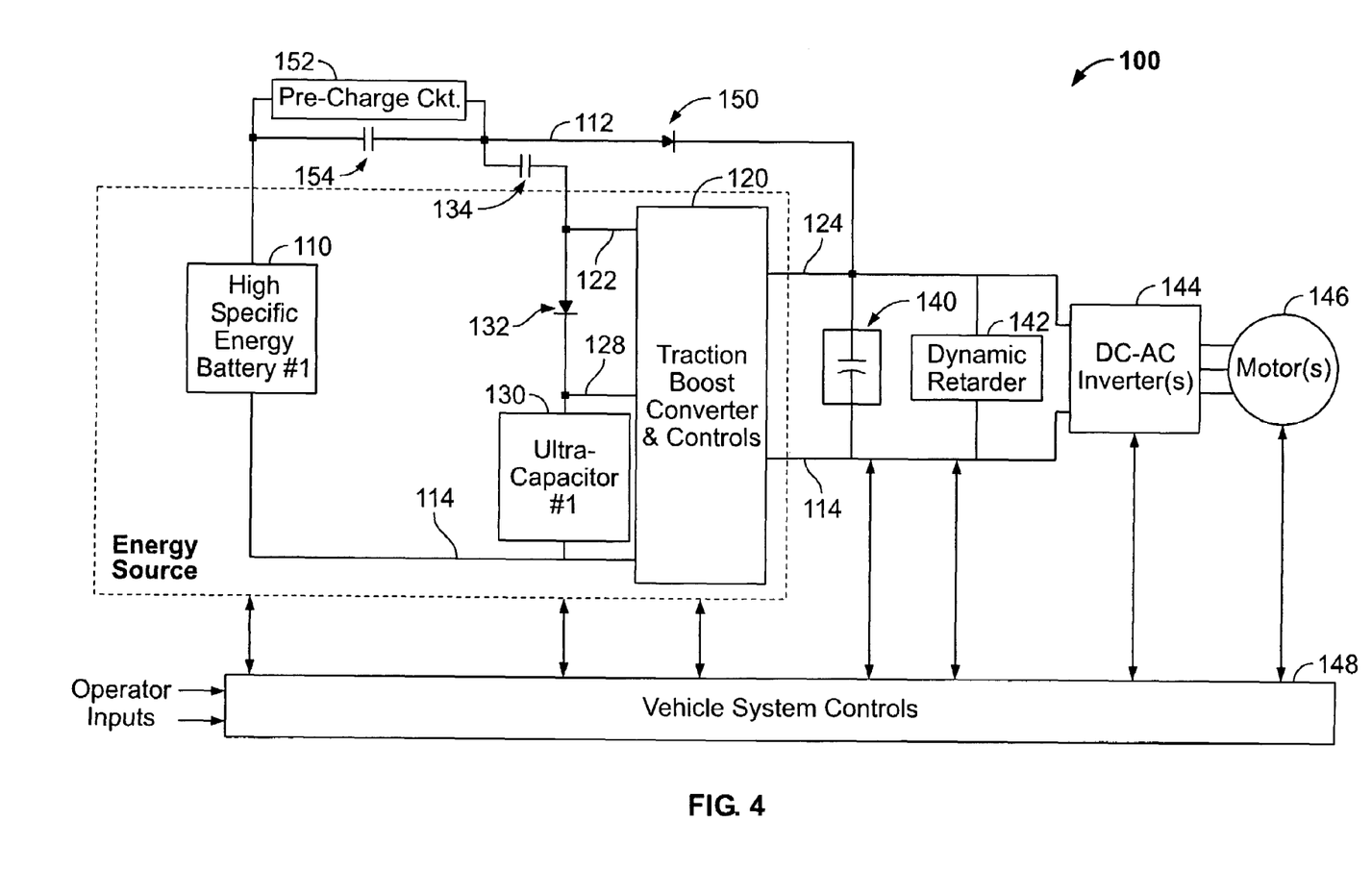
FIG. 4 illustrates an exemplary vehicle propulsion system.

Specifically, FIG. 4 illustrates a vehicle propulsion system 100 that includes a first storage unit 110 that has an input or negative terminal that is coupled to a first bus 114 also referred to a negative DC link, and an output or positive terminal that is electrically coupled to a second bus 124 also referred to a positive DC link. In the exemplary embodiment, the first storage unit 110 is a high specific energy battery that is electrically coupled between the positive and negative DC links 124 and 114 respectively. As such, the negative terminal of high energy battery 110 and ultracapacitor 130 are each electrically coupled to the negative DC link 114 of an inverter 144 on the high voltage side of the boost converter 120.

System 100 also includes a boost converter circuit 120 to boost the voltage available from the first storage unit 110. The boost converter circuit 120 may include an inductor (not shown) that couples the first bus 112 to a semiconductor switching device 132. A second semiconductor switching device 150 couples to the high side 124 of the boost converter 120 that is referred to as the positive DC Link. The term DC link or sometimes Inverter DC link is used herein to refer to the positive and negative DC busses 112 with respect to 114. The negative portion of the DC link is electrically connected to the negative terminal of the high specific energy battery 110 and the negative terminal of ultracapacitor 140, and the negative terminal of the DC-AC Inverter 144. More specifically, the boost converter 120 has an input side 122 that sees a voltage that is approximately equivalent to the voltage of the first storage unit 110 and converts this voltage to a second higher voltage that is seen at the boost converter output side 124. Thus the boost converter output side 124 is referred to as the high voltage side of the circuit.

System 100 also includes a first passive storage device 130, such as an ultracapacitor for example, connected to a second channel 128 of the low-side side of the boost converter through an inductor (not shown). A unidirectional conducting apparatus 132, such as a diode for example, is poled to conduct current from the high energy battery input channel of the boost converter to the ultracapacitor 130. As shown, the passive storage device 130, the unidirectional conducting apparatus, and the contactor 134 are wired in series between the positive DC bus 112 and the negative DC link 114 on the boost converter low voltage side 122. Ultracapacitor as used herein represents a capacitor comprised of multiple capacitor cells connected in a series arrangement where the capacitor cells each have a capacitance that is greater than 500 Farads. Ultracapacitors are often referred to as "double-layer" capacitors or supercapacitors. In the exemplary embodiment, ultracapacitor 130 has 63 cells connected in series where each cell has voltage rating of 2.7 volts and a capacitance value that is greater than 1000 Farads per cell.

System 100 also includes a second passive storage device 140 that is coupled between the positive DC link 124 and the negative DC link 114 in parallel with the boost converter 120. Specifically, the passive storage device 140 is coupled in parallel with the high voltage side 124 of the boost converter 120. In the exemplary embodiment, the second storage device 140 is an ultracapacitor.

System 100 also includes a dynamic retarder system 142 that is coupled between the positive DC link 124 and the negative DC link 114 in parallel with the second storage device 140, and an inverter 144 that is coupled to a load 146. In the exemplary embodiment, the dynamic retarder system 142 may include a high power dissipation grid resistor, a serially connected switching device, and a flyback diode that is connected in anti-parallel with the switching device to controllably vary the effective resistance impressed on the DC link 124 and thereby limit the DC voltage developed on link 124 when the motor 146 is operated in a regenerative mode returning electric power to the link through the inverter 144.

In one embodiment, inverter 144 is a DC-to-AC inverter for supplying alternating current and load 146 is an AC motor. Optionally, inverter 144 is a DC chopper or pulse width modulation circuit for providing direct current, and load 146 is a DC motor. System 100 also includes a control system referred to herein as a Vehicle Systems Control (VSC) portion that is configured to operate system 100 in various modes that will be discussed later herein.

In the exemplary embodiment, system 100 also includes a uni-directional current device 150 that is poled to allow current flow from the first storage unit 110 to the high voltage side 124 of the traction boost converter 120, a pre-charge circuit 152 and at least one DC contactor 154. In the exemplary embodiment, the uni-directional current device 150 is a diode. In use, uni-directional current device 150 facilitates channeling current from the pre-charge circuit 152 to the high-side 124 of the traction boost converter 120 to at least partially pre-charge the high-side ultracapacitor 140 from its initial assumed discharge state, and also provides power to the motor 146 during a "Limp-home" mode of operation in event of failure of the boost converter system.

During operation, the high-side ultracapacitor 140 is quickly pre-charged using pre-charge circuit 152 to approximately the nominal voltage of the high-specific energy battery 110 that is coupled on the low-side 122 of the boost converter 120. Energy for this initial pre-charge function is provided by the high-specific energy battery 110 and may be completed while the vehicle is stationary within a few seconds of the operator initiating start-up via the ignition switch command, for example. After the initial pre-charge of the ultracapacitor 140 is complete, DC contactor 154 is energized and its associated power contactors are electrically closed. At this point in time, the traction drive, i.e. motor 146 may be enabled such that the vehicle may be operated at a relatively slow speed. If the system 100 receives a command from the operator, via the VSC 148 for example, that an increase in vehicle speed is desired, the power provided to the motor 146 may be supplemented, using the traction drive, using a heat engine for example in a hybrid vehicle, or by using additional storage units if the vehicle is an all electric vehicle.

More specifically, during a normal mode of operation, the low-side ultracapacitor 130 is pre-charged using energy from the high-side 124 and also energy from the high-specific energy battery 110, through uni-directional current device 150 via bi-directional boost converter 120. When the pre-charge of the low-side inputs of the boost converter are completed, i.e. ultracapacitor 130 is at least partially charged, DC contactor 134 is closed and the pre-charge of ultracapacitor 140 continues via the boost converter 120. During operation, maximum voltage of ultracapacitor 130 is approximately two times the nominal voltage of the high-specific energy battery 110. Moreover, during normal operation, ultracapacitor 130 is configured to operate from its maximum voltage down to approximately 50% of its maximum voltage such that approximately 75% of total stored or usable energy within ultracapacitor 130 is utilized. In event that the usable energy stored by ultracapacitor 130 is exhausted and the operator continues to demand additional power to operate the vehicle, diode 132 conducts such that the boost converter is increasing the voltage from the battery 110 to the DC link voltage using two channels of the boost converter thereby allowing approximately twice the rated power compared to a single channel of the boost converter to facilitate increasing the operation speed of the vehicle.

Figure 5:
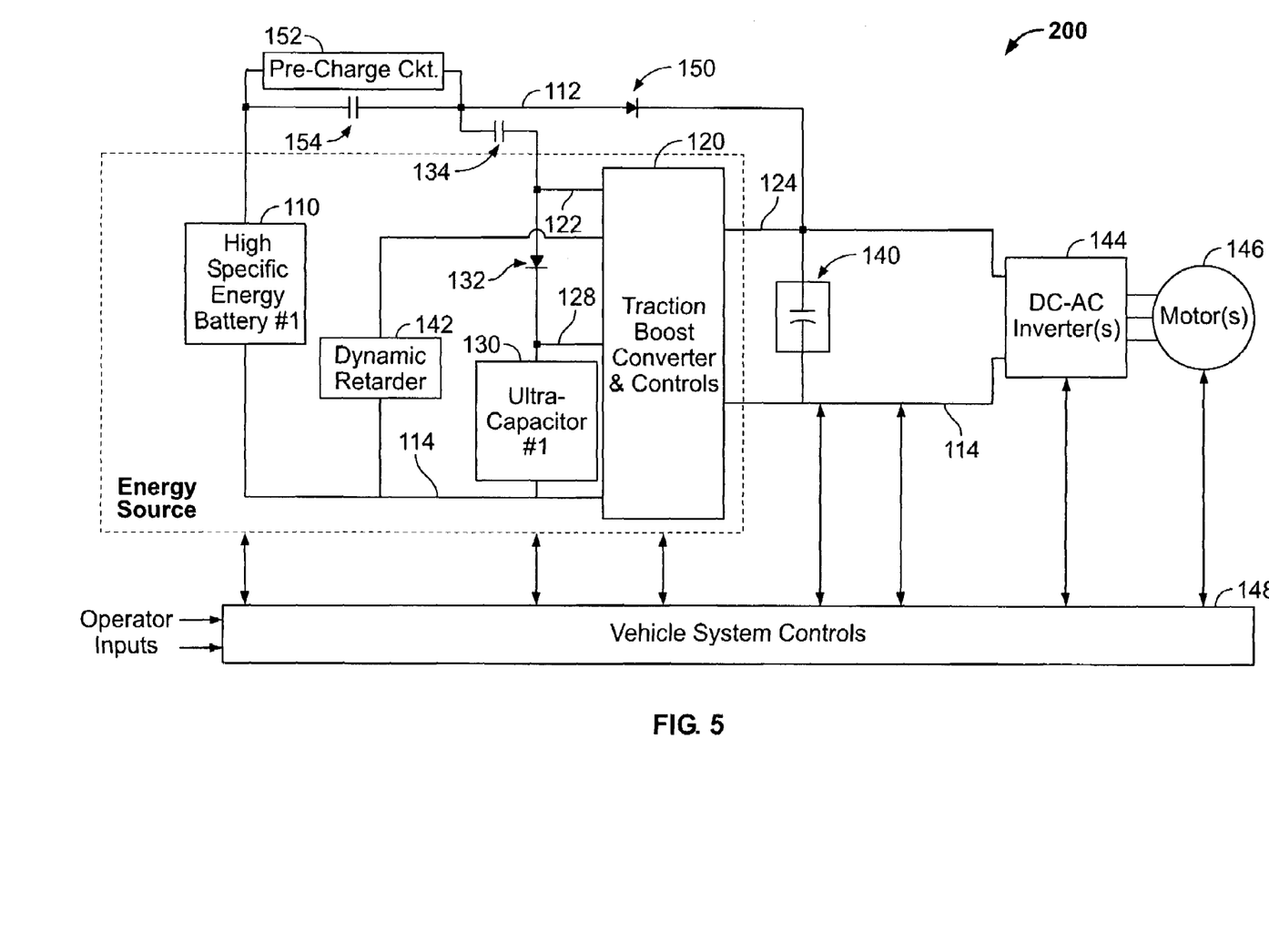
FIG. 5 illustrates an exemplary vehicle propulsion system.

FIG. 5 illustrates a system 200 that is substantially similar to system 100 shown in FIG. 4. As such numbers used to indicate components in FIG. 4 will be used to indicate the similar component in FIG. 5. In system 200 dynamic retarder 142 is not coupled on the high voltage side of boost converter 120, rather the dynamic retarder 142 is coupled on the low voltage side of boost converter 120 through a third channel. In this configuration, dynamic retarder 142 controllably varies the effective power dissipation on the DC link 124 through control of the boost converter and thereby limit the DC voltage developed across the Inverter DC link 124 with respect to 114.

Figure 6:
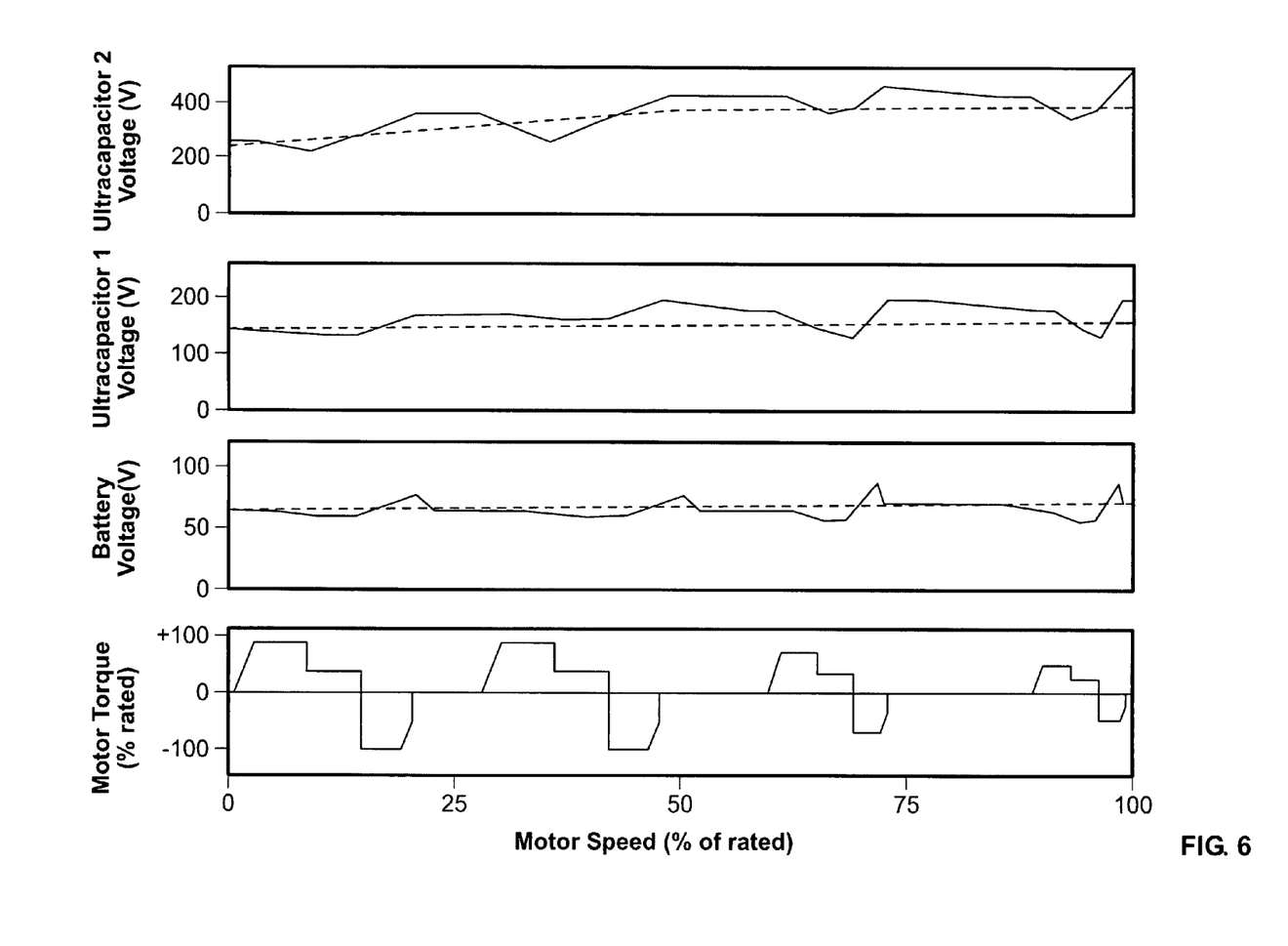
FIG. 6 is graphical illustration of the systems shown in FIG. 4 and during operation.

FIG. 6 is a graphical illustration of both system 100 and 200 shown during normal operation wherein the DC Link voltage is shown as a function of the motor speed and torque, and wherein the dotted lines represent the exemplary reference values for the associated energy storage component voltages. As shown, the full torque of the drive, for an exemplary AC motor design, is achievable by ramping the reference voltage from some predetermined minimum value to a predetermined maximum reference value at a motor speed of approximately 50% of rated speed. From 50% to 100% rated motor speed, the reference DC Link voltage is held substantially constant. As shown, ultracapacitor 140 voltage fluctuates above and below the reference line as energy is being extracted from or supplied to the device. As the ultracapacitor 140 voltage, i.e. State of Charge approaches the limit, the closed loop control provides additional energy, primarily from ultracapacitor 130, provided it is within its normal operating range (SOC). When, ultracapacitor 130 is unable to provide the energy, the lower efficiency battery 110 is utilized to provide additional energy. For example, during operation while climbing steep grades for an extended time period, the high-specific energy battery 110 provides the energy, since the energy stored in both ultracapacitors 130 and 140 is substantially depleted. Also, during the limp-home mode, the energy provided the propel the vehicle will be supplement using battery 110.

FIG. 7 is a system 300 that is substantially similar to system 100 shown in FIG. 4. As such numbers used to indicate components in FIG. 4 will be used to indicate the similar component in FIG. 7. As such, system 300 also includes an alternator 302, rectifier 304, and a 12 volt Starting Lighting and Ignition (SLI) battery 308 that are utilized to charge the high-specific energy battery 110 through a DC-DC converter 306. In the exemplary embodiment, the converter 306 facilitates isolating the voltage supplied to the battery 110 from the vehicle chassis. In the exemplary embodiment, alternator 302 is coupled to and driven by a known engine 310 within the vehicle. During operation, the charge power level of battery 110 may be limited, based on the current rating of the alternator 302 and it's associated circuits and also due to the alternator's relatively low efficiency. However, this feature will provide some low-level charging, especially while the vehicle is idling or at low speed operation.

The systems described herein facilitate providing a highly efficient utilization of the ultracapacitor/battery energy storage system. Specifically, transient energy for operation at high motor speed and torque primarily uses a high voltage ultracapacitor in a high efficiency mode, and such that transient energy for operation at moderate speed and torque primarily uses a combination of a high voltage and moderate voltage ultracapacitors, and transient energy for operation at low motor speed and the full range of motor torque is provided primarily by combination of low voltage battery and the moderate voltage ultracapacitor. As such, ultracapacitor cell balancing issues are minimized by using both multiple ultracapacitor energy storage units with high and moderate voltage requirements Therefore, the systems described herein facilitate decoupling the DC link voltage from the moderate and low voltage energy storage components which allows improved system performance and efficiency by utilizing the proper energy storage system and associated control as a function of motor speed and torque. The system weight, and thus the weight of the vehicle, is minimized by using a low-voltage, light weight battery as one component of the energy storage. During, All-Electric mode of operation, and also during Limp-Home mode, the systems provide increased range in comparison to configurations that use only ultracapacitor energy storage systems. Moreover, the overall system cost is reduced by sizing the energy storage units to simultaneously achieve the desired performance within component size and weight limits for the electric drive system, and the pre-charge function of the high-side ultracapacitor energy storage is achieved in less time than if the pre-charge function is performed from a conventional high voltage battery.

While the invention has been described in terms of various specific embodiments, those skilled in the art will recognize that the invention can be practiced with modification within the spirit and scope of the claims.

What is claimed is:

1. A vehicle propulsion system comprising:
    an alternating current (AC) traction drive;
    a first energy storage system electrically coupled to said fraction drive through a direct current (DC) link;
    a second energy storage system electrically coupled to said traction drive such that the voltage output from said second energy storage system is decoupled from said DC link using a bi-directional boost converter; and
    a uni-directional current device that is poled to conduct current from a low voltage side of a boost converter to a high voltage side of said boost converter,
    wherein said first energy storage system comprises a first ultracapacitor that is coupled on said boost converter high voltage side,
    wherein said second energy storage system comprises a second ultracapacitor and a high-specific energy battery that are each coupled on said boost converter low voltage side.

2. A vehicle propulsion system in accordance with claim 1 wherein said first ultracapacitor is comprised of multiple cells coupled in a series configuration with cell capacitance that is greater than 500 Farads.

3. A vehicle propulsion system in accordance with claim 1 wherein said second ultracapacitor has a voltage rating that is between approximately two and approximately three times greater than a nominal voltage rating of said high specific energy battery.

4. A vehicle propulsion system in accordance with claim 1 further comprising a second uni-directional current device that is poled to conduct current from said high specific energy battery to said second ultracapacitor coupled on said boost converter low voltage side.

5. A vehicle propulsion system in accordance with claim 1 wherein said first ultracapacitor has a voltage rating that is between approximately two and approximately three times greater than the maximum voltage rating of said second ultracapacitor.

6. A vehicle propulsion system in accordance with claim 1 further comprising a pre-charge circuit configured to at least partially pre-charge said first ultracapacitor.

7. A vehicle propulsion system in accordance with claim 6 further comprising a diode poled between said pre-charge circuit and said first ultracapacitor.

8. A vehicle propulsion system in accordance with claim 6 wherein said pre-charge circuit is configured to partially charge said first ultracapacitor utilizing said high-specific energy battery.

9. A vehicle comprising:
    a propulsion system comprising
    an alternating current (AC) traction drive;
    a first energy storage system electrically coupled to said traction drive through a direct current (DC) link;
    a second energy storage system electrically coupled to said traction drive such that the voltage output from the second energy storage system is decoupled from said DC link using a bi-directional boost converter; and
    a uni-directional current device that is poled to conduct current from a low voltage side of a boost converter to a high voltage side of said boost converter,
    wherein said first energy storage system comprises a first ultracapacitor that is coupled on said boost converter high voltage side,
    wherein said second energy storage system comprises a second ultracapacitor and a high-specific energy battery that are each coupled on said boost converter low voltage side.

10. A vehicle in accordance with claim 9 wherein said first ultracapacitor comprises multiple cells that are coupled in a series configuration, each said cell having a capacitance that is greater than 500 Farads.

11. A vehicle in accordance with claim 9 further comprising a second uni-directional current device that is poled to conduct current from said high specific energy battery to said second ultracapacitor coupled on said boost converter low voltage side.

12. A vehicle in accordance with claim 9 wherein said second ultracapacitor has a voltage rating that is between approximately two and approximately three times greater than the nominal voltage rating of said high specific energy battery.

13. A vehicle in accordance with claim 9 wherein said first ultracapacitor has a voltage rating that is between approximately two and approximately three times greater than the maximum voltage rating of said second ultracapacitor.

14. A vehicle in accordance with claim 9 further comprising a pre-charge circuit configured to at least partially pre-charge said first ultracapacitor.

15. A vehicle in accordance with claim 9 wherein said vehicle is a parallel hybrid vehicle.

16. A vehicle in accordance with claim 9 wherein said vehicle is an electric vehicle.

* * * * *

UNITED STATES PATENT AND TRADEMARK OFFICE
CERTIFICATE OF CORRECTION

| | | |
|---|---|---|
| PATENT NO. | : 7,568,537 B2 | Page 1 of 1 |
| APPLICATION NO. | : 11/328000 | |
| DATED | : August 4, 2009 | |
| INVENTOR(S) | : King | |

It is certified that error appears in the above-identified patent and that said Letters Patent is hereby corrected as shown below:

In Column 5, Line 57, delete "fraction" and insert -- traction --, therefor.

Signed and Sealed this

Seventeenth Day of November, 2009

David J. Kappos
*Director of the United States Patent and Trademark Office*